(12) United States Patent
Fandel et al.

(10) Patent No.: US 7,779,218 B2
(45) Date of Patent: Aug. 17, 2010

(54) DATA SYNCHRONIZATION MANAGEMENT

(75) Inventors: John Fandel, Colorado Springs, CO (US); Susan Elkington, Colorado Springs, CO (US); Randy Hess, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 954 days.

(21) Appl. No.: 11/192,806

(22) Filed: Jul. 29, 2005

(65) Prior Publication Data

US 2007/0022263 A1 Jan. 25, 2007

Related U.S. Application Data

(60) Provisional application No. 60/701,542, filed on Jul. 22, 2005.

(51) Int. Cl.
*G06F 12/16* (2006.01)

(52) U.S. Cl. .......................... 711/162; 709/232; 714/6; 707/644

(58) Field of Classification Search ................... 711/162
See application file for complete search history.

(56) References Cited

U.S. PATENT DOCUMENTS

| | | |
|---|---|---|
| 5,923,876 A | 7/1999 | Teague |
| 6,161,192 A | 12/2000 | Lubbers |
| 6,170,063 B1 | 1/2001 | Golding |
| 6,295,578 B1 | 9/2001 | Dimitroff |
| 6,397,293 B2 | 5/2002 | Shrader |
| 6,487,636 B1 | 11/2002 | Dolphin |
| 6,490,122 B1 | 12/2002 | Holmquist et al. |
| 6,493,656 B1 | 12/2002 | Houston |
| 6,505,268 B1 | 1/2003 | Schultz |
| 6,523,749 B2 | 2/2003 | Reasoner |
| 6,546,459 B2 | 4/2003 | Rust |
| 6,560,673 B2 | 5/2003 | Elliot |
| 6,587,962 B1 | 7/2003 | Hepner |
| 6,594,745 B2 | 7/2003 | Grover |
| 6,601,187 B1 | 7/2003 | Sicola |
| 6,606,690 B2 | 8/2003 | Padovano |
| 6,609,145 B1 | 8/2003 | Thompson |
| 6,629,108 B2 | 9/2003 | Frey |
| 6,629,273 B1 | 9/2003 | Patterson |
| 6,643,795 B1 | 11/2003 | Sicola |
| 6,647,514 B1 | 11/2003 | Umberger |
| 6,658,590 B1 | 12/2003 | Sicola |
| 6,663,003 B2 | 12/2003 | Johnson |
| 6,681,308 B1 | 1/2004 | Dallmann |
| 6,708,285 B2 | 3/2004 | Oldfield |
| 6,715,101 B2 | 3/2004 | Oldfield |
| 6,718,404 B2 | 4/2004 | Reuter |
| 6,718,434 B2 | 4/2004 | Veitch |
| 6,721,902 B1 | 4/2004 | Cochran |
| 6,725,393 B1 | 4/2004 | Pellegrino |
| 6,742,020 B1 | 5/2004 | Dimitroff |
| 6,745,207 B2 | 6/2004 | Reuter |

(Continued)

*Primary Examiner*—Christian P Chace
*Assistant Examiner*—Matthew Bradley (57) ABSTRACT

In one embodiment, a method comprises receiving, in a source controller, a signal indicative of a write request to a source volume managed by the source controller in response to the signal: writing data associated with the write request to a destination controller when a connection to the destination controller is available; and setting a synchronization flag associated with the data storage segment managed by the source controller when a connection to the destination controller is unavailable.

18 Claims, 6 Drawing Sheets

U.S. PATENT DOCUMENTS

| | | | |
|---|---|---|---|
| 6,763,409 B1 | 7/2004 | Elliot | |
| 6,772,231 B2 | 8/2004 | Reuter | |
| 6,775,790 B2 | 8/2004 | Reuter | |
| 6,795,904 B1 | 9/2004 | Kamvysselis | |
| 6,802,023 B2 | 10/2004 | Oldfield | |
| 6,807,605 B2 | 10/2004 | Umberger | |
| 6,817,522 B2 | 11/2004 | Brignone | |
| 6,823,453 B1 | 11/2004 | Hagerman | |
| 6,839,824 B2 | 1/2005 | Camble | |
| 6,842,833 B1 | 1/2005 | Phillips | |
| 6,845,403 B2 | 1/2005 | Chadalapaka | |
| 7,007,044 B1 * | 2/2006 | Rafert et al. | 707/203 |
| 7,010,721 B2 * | 3/2006 | Vincent | 714/20 |
| 7,039,661 B1 * | 5/2006 | Ranade | 707/204 |
| 7,152,183 B2 * | 12/2006 | Fujibayashi | 714/6 |
| 7,461,230 B1 * | 12/2008 | Gupta et al. | 711/170 |
| 2002/0019863 A1 | 2/2002 | Reuter | |
| 2002/0019908 A1 | 2/2002 | Reuter | |
| 2002/0019920 A1 | 2/2002 | Reuter | |
| 2002/0019922 A1 | 2/2002 | Reuter | |
| 2002/0019923 A1 | 2/2002 | Reuter | |
| 2002/0048284 A1 | 4/2002 | Moulton | |
| 2002/0188800 A1 | 12/2002 | Tomaszewski | |
| 2003/0051109 A1 | 3/2003 | Cochran | |
| 2003/0056038 A1 | 3/2003 | Cochran | |
| 2003/0063134 A1 | 4/2003 | Lord | |
| 2003/0074492 A1 | 4/2003 | Cochran | |
| 2003/0079014 A1 | 4/2003 | Lubbers | |
| 2003/0079074 A1 | 4/2003 | Sicola | |
| 2003/0079082 A1 | 4/2003 | Sicola | |
| 2003/0079083 A1 | 4/2003 | Lubbers | |
| 2003/0079102 A1 | 4/2003 | Lubbers | |
| 2003/0079156 A1 | 4/2003 | Sicola | |
| 2003/0084241 A1 | 5/2003 | Lubbers | |
| 2003/0101318 A1 | 5/2003 | Kaga | |
| 2003/0110237 A1 | 6/2003 | Kitamura | |
| 2003/0126315 A1 | 7/2003 | Tan | |
| 2003/0126347 A1 | 7/2003 | Tan | |
| 2003/0140191 A1 | 7/2003 | McGowen | |
| 2003/0145045 A1 | 7/2003 | Pellegrino | |
| 2003/0145130 A1 | 7/2003 | Schultz | |
| 2003/0170012 A1 | 9/2003 | Cochran | |
| 2003/0177323 A1 | 9/2003 | Popp | |
| 2003/0187847 A1 | 10/2003 | Lubbers | |
| 2003/0187947 A1 | 10/2003 | Lubbers | |
| 2003/0188085 A1 | 10/2003 | Arakawa | |
| 2003/0188114 A1 | 10/2003 | Lubbers | |
| 2003/0188119 A1 | 10/2003 | Lubbers | |
| 2003/0188153 A1 | 10/2003 | Demoff | |
| 2003/0188218 A1 | 10/2003 | Lubbers | |
| 2003/0188229 A1 | 10/2003 | Lubbers | |
| 2003/0188233 A1 | 10/2003 | Lubbers | |
| 2003/0191909 A1 | 10/2003 | Asano | |
| 2003/0191919 A1 | 10/2003 | Sato | |
| 2003/0196023 A1 | 10/2003 | Dickson | |
| 2003/0212781 A1 | 11/2003 | Kaneda | |
| 2003/0229651 A1 | 12/2003 | Mizuno | |
| 2003/0236953 A1 | 12/2003 | Grieff | |
| 2004/0019740 A1 | 1/2004 | Nakayama | |
| 2004/0022546 A1 | 2/2004 | Cochran | |
| 2004/0024838 A1 | 2/2004 | Cochran | |
| 2004/0024961 A1 | 2/2004 | Cochran | |
| 2004/0030727 A1 | 2/2004 | Armangau | |
| 2004/0030846 A1 | 2/2004 | Armangau | |
| 2004/0049634 A1 | 3/2004 | Cochran | |
| 2004/0078638 A1 | 4/2004 | Cochran | |
| 2004/0078641 A1 | 4/2004 | Fleischmann | |
| 2004/0128404 A1 | 7/2004 | Cochran | |
| 2004/0168034 A1 | 8/2004 | Homma et al. | |
| 2004/0215602 A1 | 10/2004 | Cioccarelli | |
| 2004/0230859 A1 | 11/2004 | Cochran | |
| 2004/0267959 A1 | 12/2004 | Cochran | |

* cited by examiner

DATA SYNCHRONIZATION MANAGEMENT

RELATED APPLICATIONS

This application claims priority from provisional U.S. Patent Application Ser. No. 60/701,542, entitled Data Synchronization Management by Fandel, et al., filed Jul. 22, 2005.

BACKGROUND

The described subject matter relates to electronic computing, and more particularly to data synchronization management.

Effective collection, management, and control of information have become a central component of modern business processes. To this end, many businesses, both large and small, now implement computer-based information management systems.

Data management is an important component of computer-based information management systems. Many users implement storage networks to manage data operations in computer-based information management systems. Storage networks have evolved in computing power and complexity to provide highly reliable, managed storage solutions that may be distributed across a wide geographic area.

The ability to duplicate and store the contents of a storage device is an important feature of a storage system. A storage device or network may maintain redundant copies of data to safeguard against the failure of a single storage device, medium, or communication connection. Upon a failure of the first storage device, medium, or connection, the storage system may then locate and/or retrieve a copy of the data contained in a second storage device or medium. The ability to duplicate and store the contents of the storage device also facilitates the creation of a fixed record of contents at the time of duplication. This feature allows users to recover a prior version of inadvertently edited or erased data.

Redundant copies of data records require synchronization on at least a periodic basis. Data synchronization can be a resource-intensive process. Hence, adroit management of data synchronization processes contributes to efficient operations.

SUMMARY

In one embodiment, a method comprises receiving, in a source controller, a signal indicative of a write request to a source volume managed by the source controller in response to the signal: writing data associated with the write request to a destination controller when a connection to the destination controller is available; and setting a synchronization flag associated with the data storage segment managed by the source controller when a connection to the destination controller is unavailable.

DETAILED DESCRIPTION

Described herein are exemplary system and methods for implementing data synchronization in a storage device, array, or network. The methods described herein may be embodied as logic instructions on a computer-readable medium. When executed on a processor such as, e.g., a disk array controller, the logic instructions cause the processor to be programmed as a special-purpose machine that implements the described methods. The processor, when configured by the logic instructions to execute the methods recited herein, constitutes structure for performing the described methods. The methods will be explained with reference to one or more logical volumes in a storage system, but the methods need not be limited to logical volumes. The methods are equally applicable to storage systems that map to physical storage, rather than logical storage.

Exemplary Storage Network Architectures

In one embodiment, the subject matter described herein may be implemented in a storage architecture that provides virtualized data storage at a system level, such that virtualization is implemented within a storage area network (SAN), as described in published U.S. Patent Application Publication No. 2003/0079102 to Lubbers, et al., the disclosure of which is incorporated herein by reference in its entirety.

Figure 1:
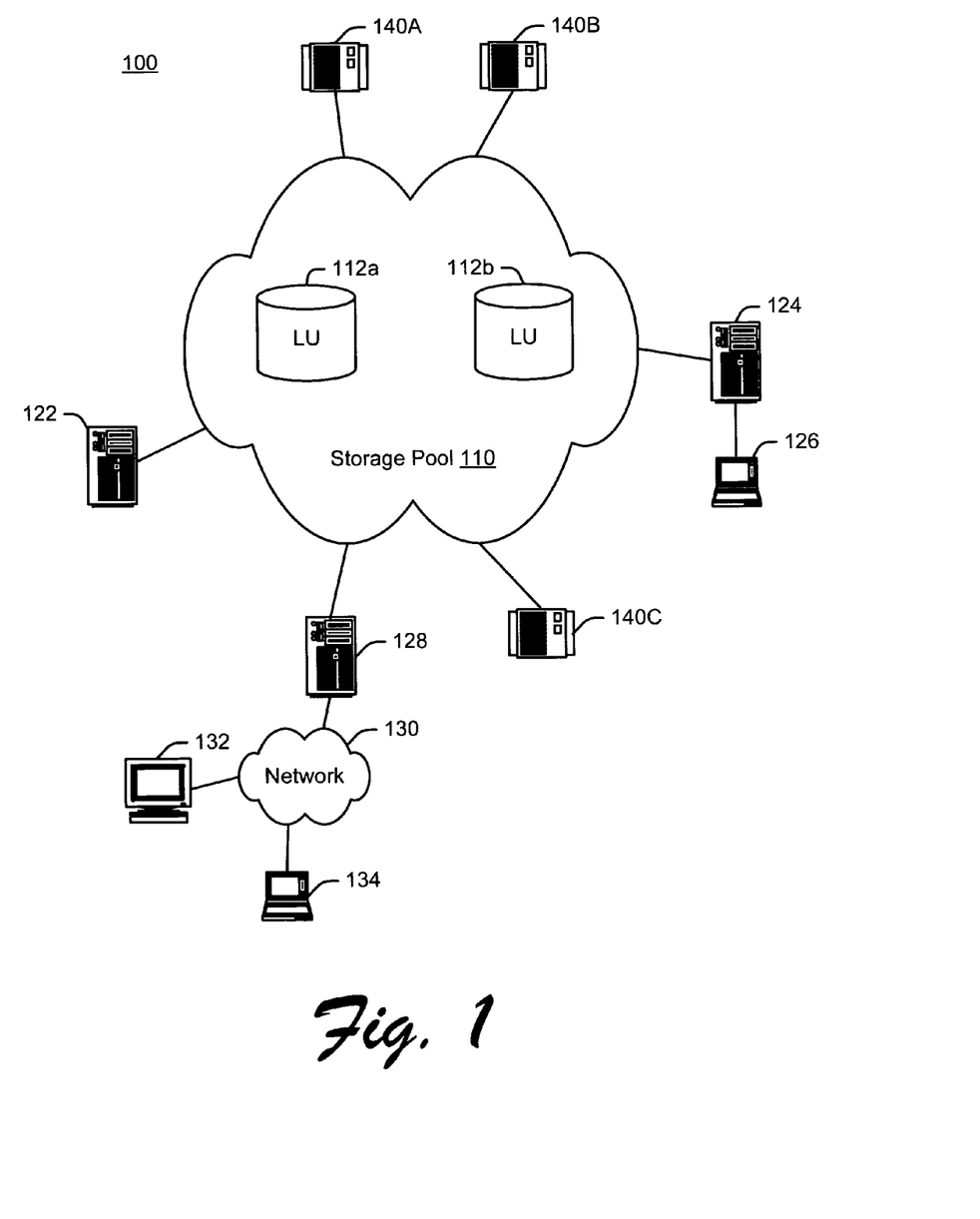
FIG. 1 is a schematic illustration of an exemplary embodiment of a storage network environment.

FIG. 1 is a schematic illustration of an exemplary implementation of a networked computing environment 100. Referring to FIG. 1, computing environment 100 includes a storage pool 110 that provides data storage services to one or more computing devices. Storage pool 110 may be implemented in one or more networked storage cells 140A, 140B, 140C. Exemplary storage cells include the STORAGEWORKS line of storage devices commercially available from Hewlett-Packard Corporation of Palo Alto, Calif., USA. Storage cells 140A, 140B, 140C may be co-located or may be geographically distributed, and may be connected by a suitable communication network. The communication network may be embodied as a private, dedicated network such as, e.g., a Fibre Channel (FC) switching fabric. Alternatively, portions of communication network may be implemented using public communication networks pursuant to a suitable communication protocol such as, e.g., the Internet Small Computer Serial Interface (iSCSI) protocol. The number of storage cells 140A, 140B, 140C that can be included in any storage network is limited primarily by the connectivity implemented in the communication network. For example, a switching fabric comprising a single FC switch can interconnect 256 or more ports, providing a possibility of hundreds of storage cells in a single storage network.

Computing environment 100 further includes one or more host computing devices which utilize storage services provided by the storage pool 110 on their own behalf or on behalf of other client computing or data processing systems or devices. Client computing devices such as client 126 access storage the storage pool 110 embodied by storage cells 140A, 140B, 140C through a host computer. For example, client computer 126 may access storage pool 110 via a host such as server 124. Server 124 may provide file services to client 126, and may provide other services such as transaction processing services, email services, etc. Host computer 122 may also utilize storage services provided by storage pool 110 on its own behalf. Clients such as clients 132, 134 may be connected to host computer 128 directly, or via a network 130 such as a Local Area Network (LAN) or a Wide Area Network (WAN).

Figure 2:
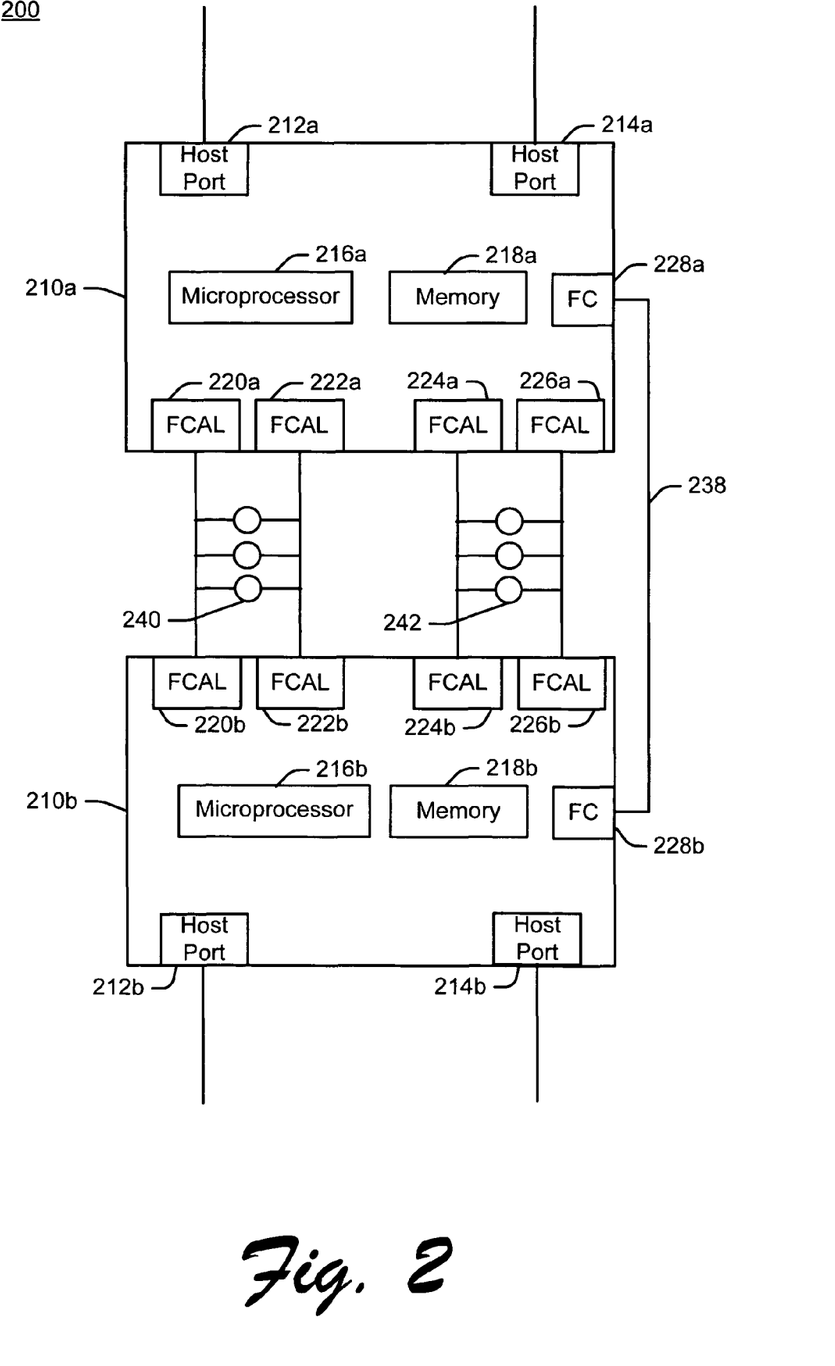
FIG. 2 is a schematic illustration of an exemplary embodiment of an array controller.

FIG. 2 is a schematic illustration of an exemplary embodiment of a storage cell 200. Storage cell 200 may correspond to one of the storage cells 140A, 140B, 140C depicted in FIG. 1. It will be appreciated that the storage cell 200 depicted in FIG. 2 is merely one exemplary embodiment, which is provided for purposes of explanation.

Referring to FIG. 2, storage cell 200 includes two Network Storage Controllers (NSCs), also referred to as "disk array controllers" or just "array controllers" 210a, 210b to manage operations and the transfer of data to and from one or more sets of disk drives 240, 242. Array controllers 210a, 210b may be implemented as plug-in cards having a microprocessor 216a, 216b, and memory 218a, 218b. Each array controller 210a, 210b includes dual host adapter ports 212a, 214a, 212b, 214b that provide an interface to a host, i.e., through a communication network such as a switching fabric. In a Fibre Channel implementation, host adapter ports 212a, 212b, 214a, 214b may be implemented as FC N_Ports. Each host adapter port 212a, 212b, 214a, 214b manages the login and interface with a switching fabric, and is assigned a fabric-unique port ID in the login process. The architecture illustrated in FIG. 2 provides a fully-redundant storage cell. This redundancy is entirely optional; only a single array controller is required to implement a storage cell.

Each array controller 210a, 210a further includes a communication port 228a, 228b that enables a communication connection 238 between the array controllers 210a, 210b. The communication connection 238 may be implemented as a FC point-to-point connection, or pursuant to any other suitable communication protocol.

In an exemplary implementation, array controllers 210a, 210b further include a plurality of Fiber Channel Arbitrated Loop (FCAL) ports 220a-226a, 220b-226b that implements an FCAL communication connection with a plurality of storage devices, e.g., sets of disk drives 240, 242. While the illustrated embodiment implement FCAL connections with the sets of disk drives 240, 242, it will be understood that the communication connection with sets of disk drives 240, 242 may be implemented using other communication protocols. For example, rather than an FCAL configuration, a FC switching fabric may be used.

In operation, the storage capacity provided by the sets of disk drives 240, 242 may be added to the storage pool 110. When an application requires storage capacity, logic instructions on a host computer such as host computer 128 establish a LUN from storage capacity available on the sets of disk drives 240, 242 available in one or more storage sites. It will be appreciated that, because a LUN is a logical unit, not a physical unit, the physical storage space that constitutes the LUN may be distributed across multiple storage cells. Data for the application may be stored on one or more LUNs in the storage network. An application that needs to access the data queries a host computer, which retrieves the data from the LUN and forwards the data to the application.

Figure 3:
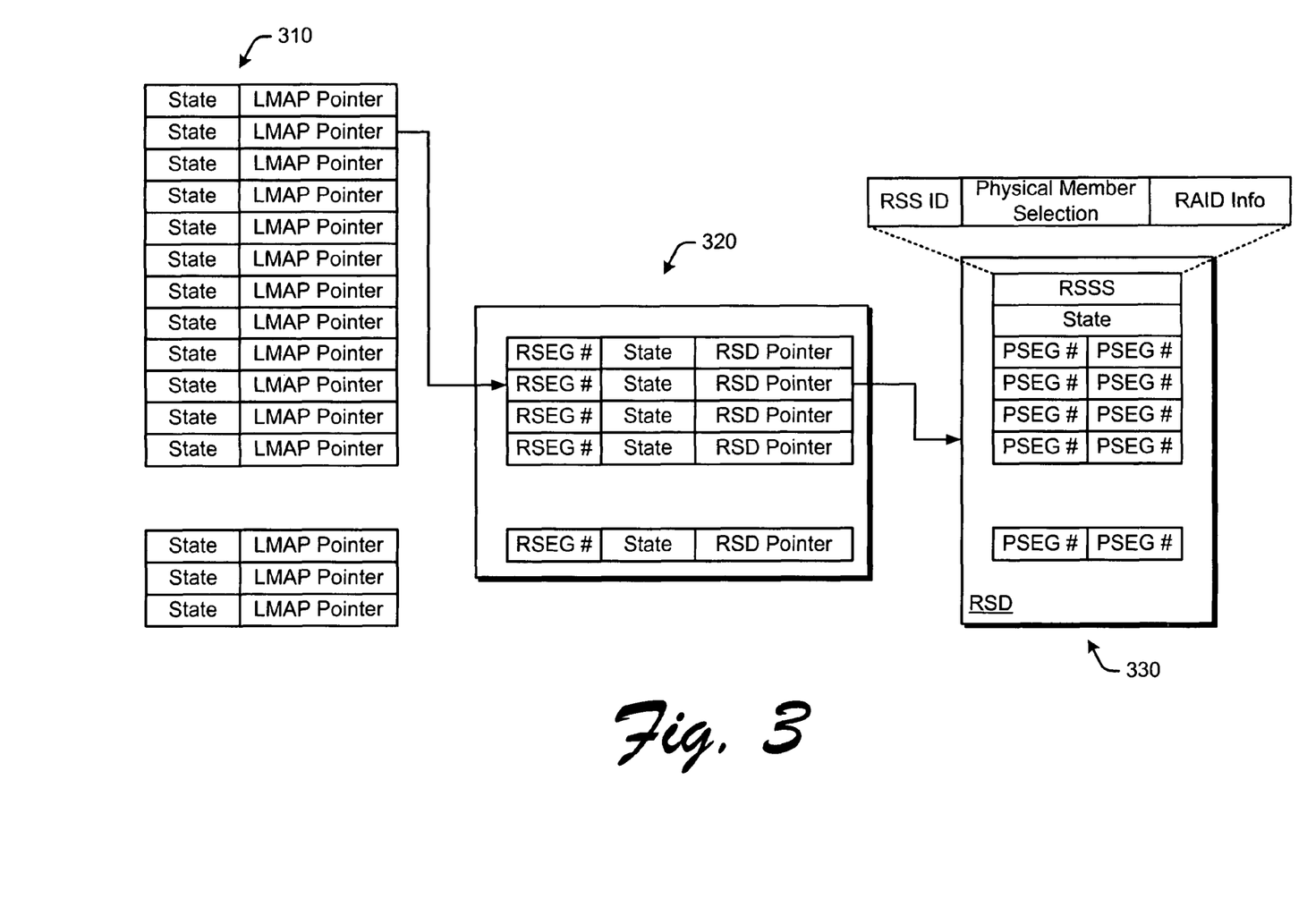
FIG. 3 is a schematic illustration of an exemplary embodiment of a data architecture that may be implemented in a storage device.

FIG. 3 is a schematic illustration of an example memory representation of a logical unit such as logical units 112a, 112b in accordance with an embodiment. As used herein, the term "memory representation" refers to a mapping structure that may be implemented in memory of a controller that enables translation of a request expressed in terms of a logical block address (LBA) from host 128 into a read/write command addressed to a particular portion of a physical disk 340, 342 having the desired information.

The memory representation enables each logical unit 112a, 112b to implement from 1 Mbyte to 2 TByte of physical storage capacity. Larger storage capacities per logical unit may be implemented. Further, the memory representation enables each logical unit to be defined with any type of RAID data protection, including multi-level RAID protection, as well as supporting no redundancy. Moreover, multiple types of RAID data protection may be implemented within a single logical unit such that a first range of logical disk addresses (LDAs) correspond to unprotected data, and a second set of LDAs within the same logical unit implement RAID 5 protection.

A persistent copy of a memory representation illustrated in FIG. 3 is maintained for logical units such as logical units 112a, 112b in a metadata container referred to herein as a primary logical disk metadata container (PLDMC). A LUN such as LUN 112a, 112b comprises one or more redundant stores (RStore) which are a fundamental unit of reliable storage. An RStore, in turn, comprises an ordered set of physical storage segments (PSEGs) with associated redundancy properties and is contained entirely within a single redundant store set (RSS). By analogy to conventional storage systems, PSEGs are analogous to disk drives and each RSS is analogous to a RAID storage set comprising a plurality of drives.

The PSEGs that implement a particular LUN may be spread across any number of physical storage disks. Moreover, the physical storage capacity that a particular LUN represents may be configured to implement a variety of storage types offering varying capacity, reliability and availability features. For example, some LUNs may represent striped, mirrored and/or parity-protected storage. Other LUNs may represent storage capacity that is configured without striping, redundancy or parity protection.

A logical disk mapping layer maps a LDA specified in a request to a specific RStore as well as an offset within the RStore. Referring to the embodiment shown in FIG. 3, the present invention is implemented using an L2MAP 310, an LMAP 320, and a redundancy set descriptor (RSD) 330 as the primary structures for mapping a logical disk address to physical storage location(s) represented by that address. The mapping structures shown in FIG. 3 may be implemented for each logical unit. A single L2MAP 310 handles the entire logical unit. Each logical unit is represented by multiple LMAPs 320 where the particular number of LMAPs 320 depends on the amount of address space that is allocated at any given time. RSDs 330 also exist only for allocated storage space. Using this split directory approach, a large storage volume that is sparsely populated with allocated storage, the structure shown in FIG. 3 efficiently represents the allocated storage while minimizing data structures for unallocated storage.

In one embodiment, L2MAP 310 includes a plurality of entries, each of which represents 2 Gbyte of address space. For a 2 Tbyte logical unit, therefore, L2MAP 310 includes 1024 entries to cover the entire address space in the particular example. Each entry may include state information relating to the corresponding 2 Gbyte of storage, and an LMAP pointer to a corresponding LMAP descriptor 320. The state information and LMAP pointer are set when the corresponding 2 Gbyte of address space have been allocated, hence, some entries in L2MAP 310 will be empty or invalid in many applications.

The address range represented by each entry in LMAP 320, is referred to as the logical disk address allocation unit (LDAAU). In one embodiment, the LDAAU is 1 MByte. An entry is created in LMAP 320 for each allocated LDAAU without regard to the actual utilization of storage within the LDAAU. In other words, a logical unit can grow or shrink in size in increments of 1 Mbyte. The LDAAU represents the granularity with which address space within a logical unit can be allocated to a particular storage task.

An LMAP 320 exists for each 2 Gbyte increment of allocated address space. If less than 2 Gbyte of storage are used in a particular logical unit, only one LMAP 320 is required, whereas, if 2 Tbyte of storage is used, 1024 LMAPs 320 will exist. Each LMAP 320 includes a plurality of entries, each of which may correspond to a redundancy segment (RSEG). An RSEG is an atomic logical unit that is analogous to a PSEG in the physical domain—akin to a logical disk partition of an RStore.

In one embodiment, an RSEG may be implemented as a logical unit of storage that spans multiple PSEGs and implements a selected type of data protection. Entire RSEGs within an RStore may be bound to contiguous LDAs. To preserve the underlying physical disk performance for sequential transfers, RSEGs from an RStore may be located adjacently and in order, in terms of LDA space, to maintain physical contiguity. If, however, physical resources become scarce, it may be necessary to spread RSEGs from RStores across disjoint areas of a logical unit. The logical disk address specified in a request selects a particular entry within LMAP 320 corresponding to a particular RSEG that in turn corresponds to 1 Mbyte address space allocated to the particular RSEG #. Each LMAP entry also includes state information about the particular RSEG #, and an RSD pointer.

Optionally, the RSEG #s may be omitted, which results in the RStore itself being the smallest atomic logical unit that can be allocated. Omission of the RSEG # decreases the size of the LMAP entries and allows the memory representation of a logical unit to demand fewer memory resources per MByte of storage. Alternatively, the RSEG size can be increased, rather than omitting the concept of RSEGs altogether, which also decreases demand for memory resources at the expense of decreased granularity of the atomic logical unit of storage. The RSEG size in proportion to the RStore can, therefore, be changed to meet the needs of a particular application.

In one embodiment, the RSD pointer points to a specific RSD 330 that contains metadata describing the RStore in which the corresponding RSEG exists. The RSD includes a redundancy storage set selector (RSSS) that includes a redundancy storage set (RSS) identification, a physical member selection, and RAID information. The physical member selection may include a list of the physical drives used by the RStore. The RAID information, or more generically data protection information, describes the type of data protection, if any, that is implemented in the particular RStore. Each RSD also includes a number of fields that identify particular PSEG numbers within the drives of the physical member selection that physically implement the corresponding storage capacity. Each listed PSEG # may correspond to one of the listed members in the physical member selection list of the RSSS. Any number of PSEGs may be included, however, in a particular embodiment each RSEG is implemented with between four and eight PSEGs, dictated by the RAID type implemented by the RStore.

In operation, each request for storage access specifies a logical unit such as logical unit 112a, 112b, and an address. A controller such as array controller 210A, 210B maps the logical drive specified to a particular logical unit, then loads the L2MAP 310 for that logical unit into memory if it is not already present in memory. Preferably, all of the LMAPs and RSDs for the logical unit are also loaded into memory. The LDA specified by the request is used to index into L2MAP 310, which in turn points to a specific one of the LMAPs. The address specified in the request is used to determine an offset into the specified LMAP such that a specific RSEG that corresponds to the request-specified address is returned. Once the RSEG # is known, the corresponding RSD is examined to identify specific PSEGs that are members of the redundancy segment, and metadata that enables a NSC 210A, 210B to generate drive specific commands to access the requested data. In this manner, an LDA is readily mapped to a set of PSEGs that must be accessed to implement a given storage request.

In one embodiment, the L2MAP consumes 4 Kbytes per logical unit regardless of size. In other words, the L2MAP includes entries covering the entire 2 Tbyte maximum address range even where only a fraction of that range is actually allocated to a logical unit. It is contemplated that variable size L2MAPs may be used, however such an implementation would add complexity with little savings in memory. LMAP segments consume 4 bytes per Mbyte of address space while RSDs consume 3 bytes per MB. Unlike the L2MAP, LMAP segments and RSDs exist only for allocated address space.

Figure 4:
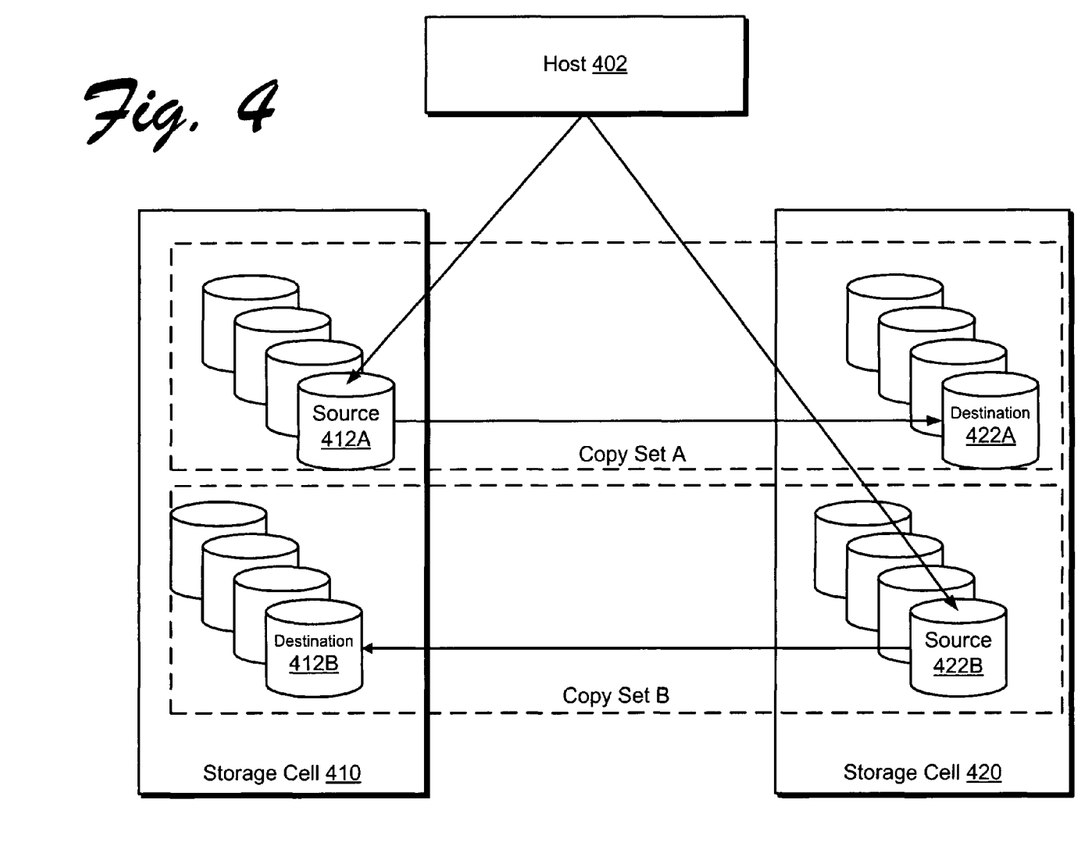
FIG. 4 is a schematic illustration of a storage architecture utilized to manage data replication operations in accordance with an embodiment.

Storage systems may be configured to maintain duplicate copies of data to provide redundancy. Input/Output (I/O) operations that affect a data set may be replicated to redundant data set. FIG. 4 is a schematic illustration of a storage architecture utilized to manage data replication operations in accordance with an embodiment. In the embodiment depicted in FIG. 4, a storage cell such as storage cell 140A, 140B, 140C may be implemented at one or more sites of a storage network. One or more virtual disks, referred to as "source" disks or a "source volume," are allocated within a first storage cell to handle input/output operations data with one or more hosts. Further, one or more virtual disks, referred to as "destination" disks or a "destination volume," are allocated within a second storage cell to execute data replication operations with the virtual disks in the first storage cell.

In the embodiment depicted in FIG. 4, one or more virtual disks 412A in storage cell 410 may be designated as a source volume for I/O operations from host 402, and one or more virtual disks 422A functions as a destination for data replication operations for source virtual disks 412A. Source 412A and destination 422A define a copy set, designated in FIG. 4 as copy set A. Similarly, one or more virtual disks 422B in storage cell 420 may be designated as a source volume for I/O operations from host 402, and one or more virtual disks 412B functions as a destination for data replication operations for source virtual disks 422B. Source 422B and destination 412B define a copy set, designated in FIG. 4 as copy set B.

In normal operation, write operations from host 402 are directed to the designated source virtual disk 412A, 422B, and may be copied in a background process to one or more destination virtual disks 422A, 412B, respectively. A destination virtual disk 422A, 412B may implement the same logical storage capacity as the source virtual disk, but may provide a different data protection configuration. Controllers such as array controller 210A, 210B at the destination storage cell manage the process of allocating memory for the destination virtual disk autonomously. In one embodiment, this allocation involves creating data structures that map logical addresses to physical storage capacity, as described in greater detail in published U.S. Patent Application Publication No.

2003/0084241 to Lubbers, et al., the disclosure of which is incorporated herein by reference in its entirety.

To implement a copy transaction between a source and destination, a communication path between the source and the destination sites is determined and a communication connection is established. The communication connection need not be a persistent connection, although for data that changes frequently, a persistent connection may be efficient. A heartbeat may be initiated over the connection. Both the source site and the destination site may generate a heartbeat on each connection. Heartbeat timeout intervals may be adaptive based, e.g., on distance, computed round trip delay, or other factors.

In one embodiment, an array controller such as one of the array controller 210A, 210B defines a data replication management (DRM) group as one or more source volumes associated with one or more destination volumes. DRM source group members (i.e., virtual disks) are logically associated with a remote destination group member's virtual disks. The copy set is represented by this association. In FIG. 4, virtual disks 412A are associated with virtual disks 422A to form a copy set (copy set A) and virtual disks 422B are associated with virtual disks 412B to form another copy set (copy set B).

DRM groups may be used to maintain data consistency upon failure and preserve write order sequence among source virtual disks. The consistency property applies when the group has more than one member. A group maintains write ordering among the members for asynchronous operation and logging/merging. Asynchronous operation refers to an operation mode in which a modification to one member of a copy set can be propagated to other members of the copy set after a time delay. During this time delay, the various replicas are inexact. When asynchronous operation is allowed, all replicas should eventually implement the modification. Since multiple modification operations may be pending but uncommitted against a particular replica, the original order in which the modifications were presented should be preserved when the pending modifications are applied to each replica. Even when asynchronous operation is not explicitly allowed, a destination volume may become unavailable for a variety of reasons, in which case a copy set is implicitly operating in an asynchronous mode.

To ensure write order preservation an array controller may maintain a log for each DRM group, e.g., in a non-volatile cache, that records the history of write commands and data from a host. The log may be sized to store all write transactions until the transaction is committed to each member of a copy set. When required, the log can be replayed to merge the pending writes, in order, to each remote group. When required, the cached writes can be written to a log on media along with subsequent host writes and then later replayed to merge the pending writes, in order, to each remote group. The ordering algorithm uses a "group sequence number" and the remote groups ensure that the data is written in order sequence. Group members enter and exit logging at the same time, to assure order across the volumes.

In one embodiment, members of a DRM group may have the same alternate site. A DRM group may include up to 32 virtual disks in a particular implementation. A virtual disk can belong to at most one group. Virtual disks in the same DRM group may belong to different disk groups. When a DRM group object is created on a source controller, the source controller automatically creates a symmetric group object on the alternate site controller. A DRM group is created during copy set creation if the user chooses not to use an existing group.

Exemplary Operations

Figure 5:
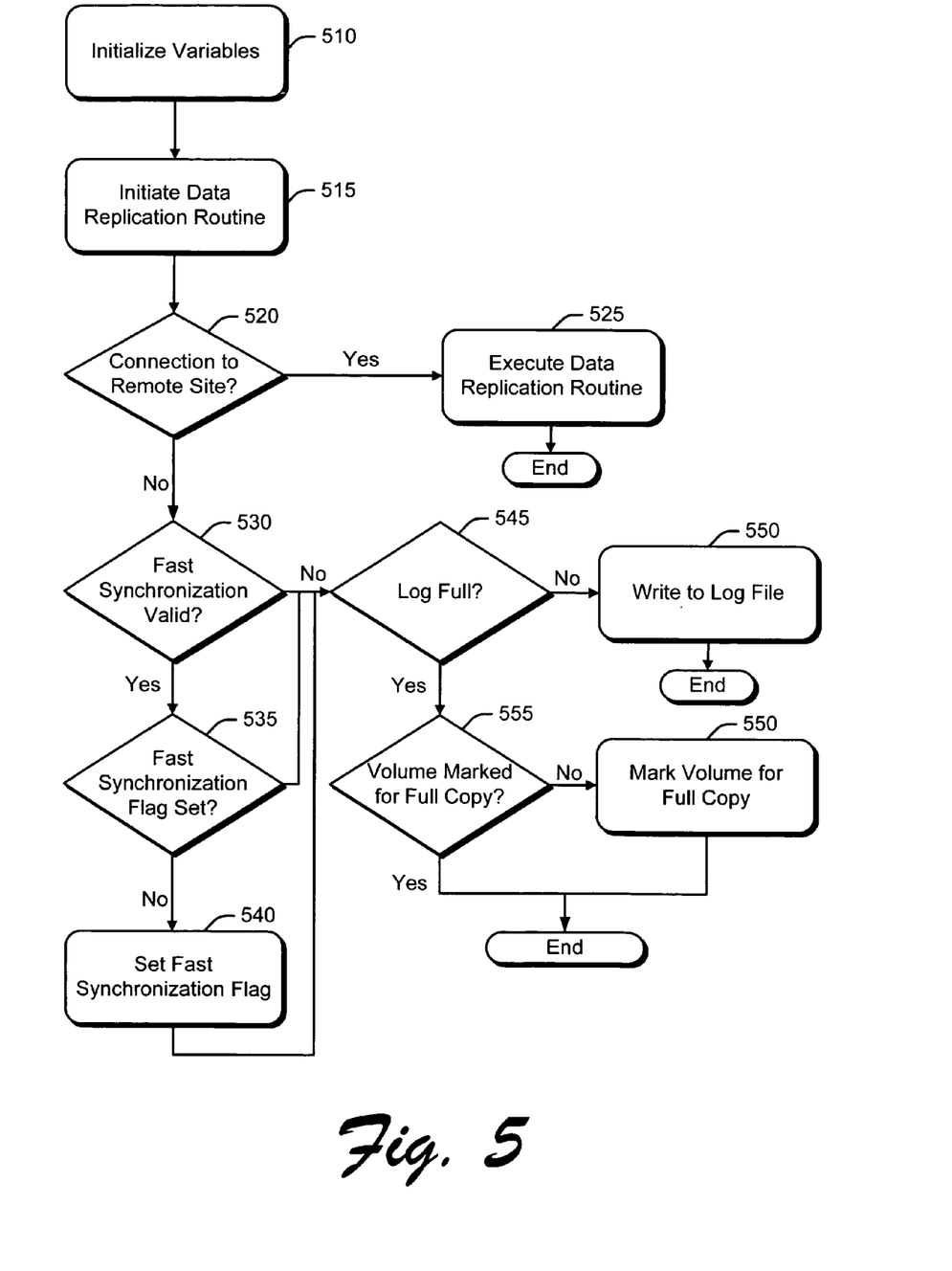
FIG. 5 is a flowchart illustrating operations in a method for implementing data synchronization operations in a storage network in accordance with an embodiment.
Figure 6:
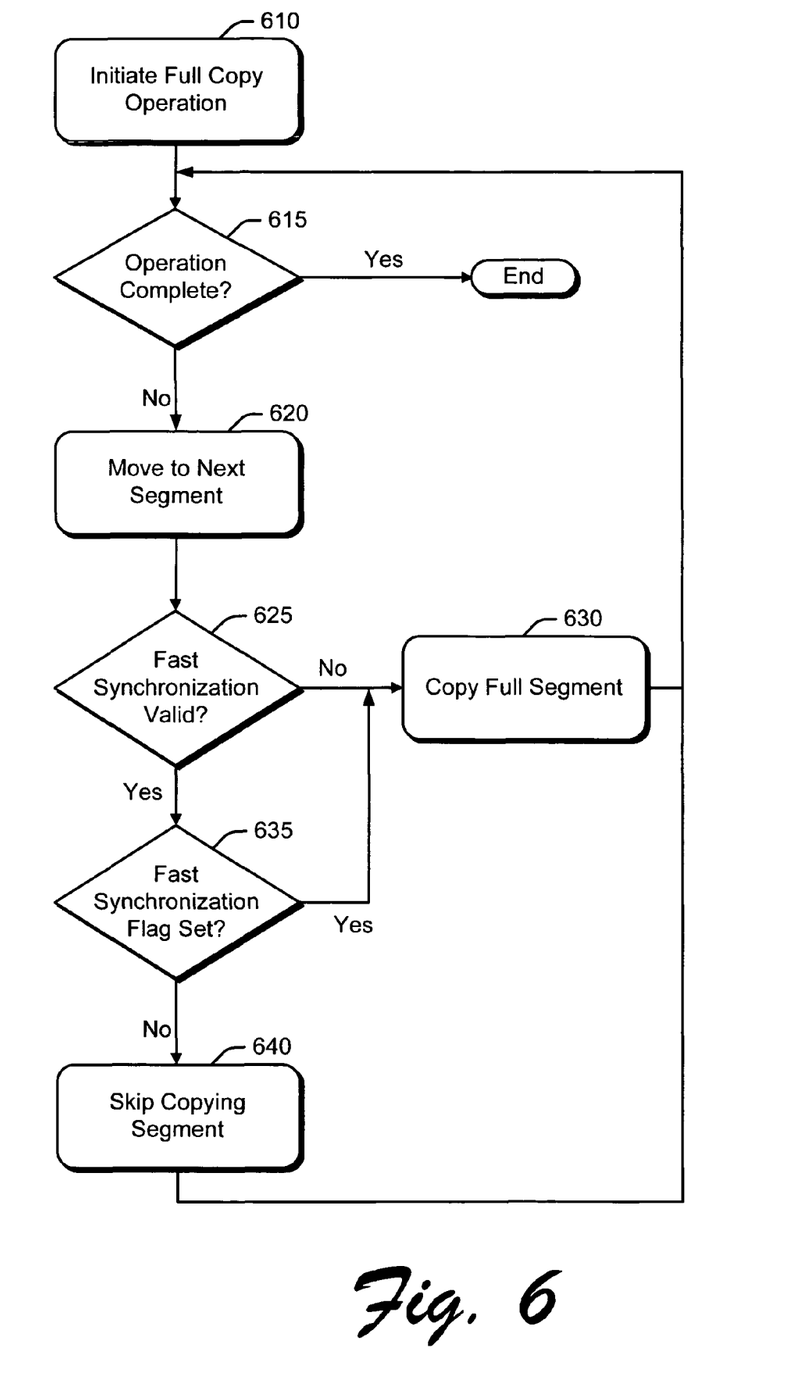
FIG. 6 is a flowchart illustrating operations in a method for implementing copy operations in a storage network in accordance with an embodiment.

FIGS. 5-6 are flowcharts illustrating operations in a first embodiment of a method to implement data synchronization in a storage network. In one embodiment, the operations of FIG. 6 may be implemented in a controller such as, e.g., a disk array controller 310A, 310B, to manage data replication operations in a DRM group, as described above.

FIG. 5 is a flowchart illustrating operations in a method for implementing data synchronization operations in a storage network. In one embodiment, the operations of FIG. 5 may be invoked when an array controller receives a write I/O operation that modifies the contents of data in a DRM group. Referring to FIG. 5, at operation 510 the controller may initialize variables such as, e.g., flags, etc. used to manage write operations. At operation 510 the array controller may initiate a data replication routine to replicate the write I/O operation to the destination volume(s) in the DRM group.

If, at operation 520, there is a connection to the remote site(s) that host the destination volume(s), then control passes to operation 525 and a data replication routine may be implemented to replicate the write I/O operation to the destination volume. By contrast, if at operation 520 there is not a connection to the remote site, then control passes to operation 530. In one embodiment the connection status may be determined by monitoring for heartbeats from the remote site. In an alternate embodiment the connection status may be determined by pinging the remote site and waiting for a reply from the remote site.

At operation 530 the array controller determines whether fast synchronization is valid. In one embodiment, fast synchronization authorization may be managed at the DRM group level. For example, a DRM group may include an authorization parameter that indicates whether fast synchronization is authorized and/or available. A source array controller may set the status of the authorization parameter based on input from a user such as a system administrator and/or based on the status of the destination. For example, if one or more destination volumes are unavailable then the authorization parameter may be set to reflect that fast synchronization is invalid for the DRM group.

If, at operation 530, fast synchronization is determined to be valid, then control passes to operation 535, and the array controller determines whether the fast synchronization flag is set. In one embodiment, a source controller maintains a fast synchronization flag associated with each logical segment of addressable memory space. For example, referring briefly to FIG. 4, the source array controller may maintain a fast synchronization flag associated with each RSEG in the memory mapping. In alternate embodiments, the fast synchronization flag could be associated with PSEGs, or at any other level of granularity in the memory mapping.

In one embodiment, the fast synchronization flag is used to indicate that the data in the logic segment associated with the fast synchronization flag has been changed by a write I/O operation. Hence, if at operation 535 the fast synchronization flag is not set, then control passes to operation 540 and the array controller sets the fast synchronization flag.

At operation 545 it is determined whether the log file is full. If the log file is not full, then control passes to operation 550 and the source array controller writes the write I/O operation to the log file. By contrast, if at operation 545 the log file is full, then control passes to operations 555-560, which mark the source volume for a full copy if the source volume is not already so marked.

The operations of FIG. 5 permit an array controller to perform conventional replication operations when a DRM group is operational. By contrast, when a DRM group is not operational, write I/O operations to the source volume are written to a log file. When the log file reaches it's capacity, the source volume is marked for a full copy operation, and storage segments affected by write I/O operations are marked for fast synchronization. During a recovery process the source controller may replay the log file to destination volume(s) and/or may initiate a full copy process to copy the contents of the source volume(s) of a DRM group to the respective destination volume(s) of a DRM group.

FIG. 6 is a flowchart illustrating operations in a method for implementing copy operations in a storage network in accordance with an embodiment. In one embodiment the copy operations may be implemented as a full copy operation, e.g., during a recovery process.

At operation 610 a full copy operation is implemented, e.g., by the source array controller. If, at operation 615, the full copy operation is not complete, then control passes to operation 620 and the next segment is selected. If, at operation 625, fast synchronization is not valid for the DRM group then control passes to operation 630 and the full segment is copied. Similarly, if at operation 635 the fast synchronization flag is set for the segment, the control passes to operation 630 and the full segment is copied.

By contrast, if the fast synchronization flag is not set, then the source array controller skips copying the segment (operation 640). Control then passes back to operation 615. The operations of FIG. 6 may be repeated until the full copy operation is complete, e.g., until all segments have been evaluated for copying, e.g., to the destination volume(s). The operations of FIGS. 5-6 expedite the synchronization process by marking segments affected by write I/O operations and copying only those segments during the recovery operation.

In an alternate embodiment the source controller may maintain a count parameter indicative of the number of segments in the source volume which have had their fast synchronization flag set. For example, in such an embodiment, at operation 540 the source controller increments this count parameter each time the controller sets a fast synchronization flag. During the recovery process, the source controller may implement logic that marks the volume for a full copy when the count parameter exceeds a threshold. The threshold may be fixed (e.g., a fixed number of fast synchronization flags), may correspond to a portion of the segments in the volume (e.g., X % of the segments in the volume), or may be set dynamically based on operating conditions in the storage network. For example, during peak traffic periods the threshold may be set high to preserve bandwidth on the network. By contrast, during periods of low usage, the threshold may be set low since bandwidth is readily available.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to implement data synchronization in a data replication management group managed by a source controller and a data destination controller, comprising:

receiving, in the source controller, a signal indicative of a write request to a data storage segment in a source volume managed by the source controller;

in response to the signal:
    writing data associated with the write request to the destination controller when a connection to the destination controller is available;
    setting a synchronization flag associated with the data storage segment managed by the source controller when a connection to the destination controller is unavailable; and
    marking the source volume for the full copy operation when a connection to the destination controller is unavailable and a log file is full; and initiating a data replication routine to synchronize data in the data replication management group; comprising:
    if a fast synchronization operation is valid for the data replication management group and the source volume is marked for full copy operation, copying the data storage segment based on the synchronization flag;
    if a fast synchronization operation is not valid for the data replication management group and the source volume is marked for full copy operation, copying the entire source volume; and
    if the source volume is not marked for full copy operation, replaying the log file.

2. The method of claim 1, wherein:
the source controller manages a first virtualized memory space; and
the write request identifies a segment of the first virtualized memory space.

3. The method of claim 1, wherein:
the destination controller manages a second virtualized memory space; and
the second virtualized memory space includes a destination volume that is a replica of the source volume.

4. The method of claim 1, further comprising writing data associated with the write request to a log file managed by the source controller when a connection to the destination controller is unavailable and the log file has capacity for additional data.

5. The method of claim 1, further comprising:
initiating a remote copy process to copy contents of the source volume to the destination volume, wherein the remote copy process copies a segment of the source volume only if the synchronization flag associated with the segment is set.

6. The method of claim 1, further comprising:
maintaining a count representative of a number of segments in the source volume for which the synchronization flag is set; and
marking the volume for a full copy when the count exceeds a threshold.

7. An array controller, comprising:
a first I/O port that provides an interface to a host computer;
a second I/O port that provides an interface a storage device;
a processor that receives I/O requests generated by the host computer and, in response to the I/O requests, generates and transmits I/O requests to the storage device; and
a memory module communicatively connected to the processor and comprising logic instructions which, when executed by the processor, configure the processor to:
    receive a signal indicative of a write request to a data storage segment in a source volume managed by the array controller, and in response to the signal to:

write data associated with the write request to a destination controller when a connection to the destination controller is available;
set a synchronization flag associated with the data storage segment managed by the array controller when a connection to the destination controller is unavailable; and
mark the source volume for a full copy operation when a connection to the destination controller is unavailable and a log file is full; and
initiate a data replication routine to synchronize data in the data replication management group, comprising:
if a fast synchronization operation is valid for the data replication management group and the source volume is marked for full copy operation, copy the data storage segment based on the synchronization flag;
if a fast synchronization operation is not valid for the data replication management group and the source volume is marked for full copy operation, copy the entire source volume; and
if the source volume is not marked for full copy operation, replay the log file.

8. The array controller of claim 7, wherein:
the array controller manages a first virtualized memory space; and
the write request identifies a segment of the first virtualized memory space.

9. The array controller of claim 7, wherein:
the destination controller manages a second virtualized memory space; and
the second virtualized memory space includes a destination volume that is a replica of the source volume.

10. The array controller of claim 7, further comprising logic instructions which, when executed by the processor, configure the processor to write data associated with the write request to a log file managed by the source controller when a connection to the destination controller is unavailable and the log file has capacity for additional data.

11. The array controller of claim 7, further comprising logic instructions which, when executed by the processor, configure the processor to initiate a remote copy process to copy contents of the source volume to the destination volume, wherein the remote copy process copies a segment of the source volume only if the synchronization flag associated with the segment is set.

12. The array controller of claim 7, further comprising logic instructions which, when executed by the processor, configure the processor to:
maintain a count representative of a number of segments in the source volume for which the synchronization flag is set; and
mark the volume for a full copy when the count exceeds a threshold.

13. A computer program product comprising logic instructions stored on a non-transitory computer-readable medium which, when executed by a processor, configure the processor to:
receive a signal indicative of a write request to a data storage segment in a source volume managed by an array controller;
in response to the signal to:
write data associated with the write request to a destination controller when a connection to the destination controller is available;
set a synchronization flag associated with the data storage segment managed by the array controller when a connection to the destination controller is unavailable; and
mark the source volume for a full copy operation when a connection to the destination controller is unavailable and a log file is full; and
initiate a data replication routine to synchronize data in the data replication management group, comprising:
if a fast synchronization operation is valid for the data replication management group and the source volume is marked for full copy operation, copy the data storage segment based on the synchronization flag;
if a fast synchronization operation is not valid for the data replication management group and the source volume is marked for full copy operation, copy the entire source volume; and
if the source volume is not marked for full copy operation, replay the log file.

14. The computer program product of claim 13, wherein:
the array controller manages a first virtualized memory space; and
the write request identifies a segment of the first virtualized memory space.

15. The computer program product of claim 13, wherein:
the destination controller manages a second virtualized memory space;
the second virtualized memory space includes a destination volume that is a replica of the source volume.

16. The computer program product of claim 13, further comprising logic instructions which, when executed by the processor, configure the processor to write data associated with the write request to a log file managed by the source controller when a connection to the destination controller is unavailable and the log file has capacity for additional data.

17. The computer program product of claim 13, further comprising logic instructions which, when executed by the processor, configure the processor to initiate a remote copy process to copy contents of the source volume to the destination volume, wherein the remote copy process copies a segment of the source volume only if the synchronization flag associated with the segment is set.

18. The computer program product of claim 13, further comprising logic instructions which, when executed by the processor, configure the processor to:
maintain a count representative of a number of segments in the source volume for which the synchronization flag is set; and
mark the volume for a full copy when the count exceeds a threshold.

* * * * *

UNITED STATES PATENT AND TRADEMARK OFFICE
CERTIFICATE OF CORRECTION

PATENT NO. : 7,779,218 B2
APPLICATION NO. : 11/192806
DATED : August 17, 2010
INVENTOR(S) : John Fandel et al.

Page 1 of 1

It is certified that error appears in the above-identified patent and that said Letters Patent is hereby corrected as shown below:

In column 10, line 16, in Claim 1, delete "group;" and insert -- group, --, therefor.

Signed and Sealed this
Fifth Day of April, 2011

David J. Kappos
*Director of the United States Patent and Trademark Office*